G. LETTENMYER.
Carpenter's Work-Bench.
No. 227,275. Patented May 4, 1880.
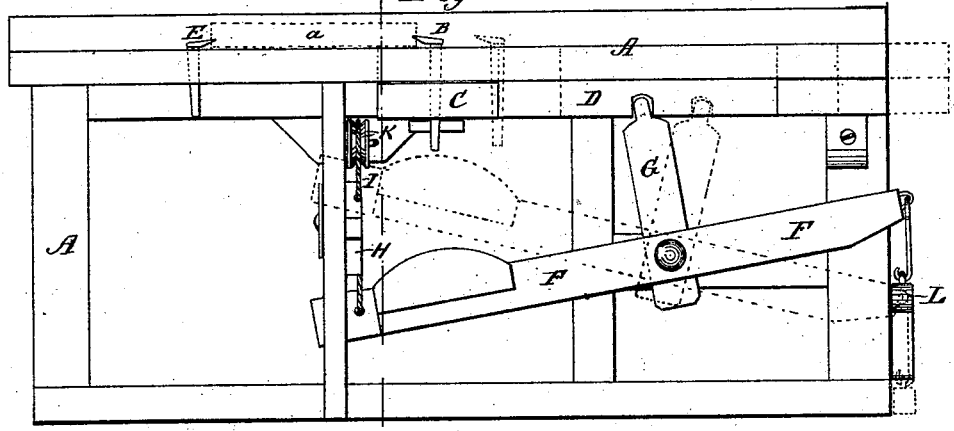
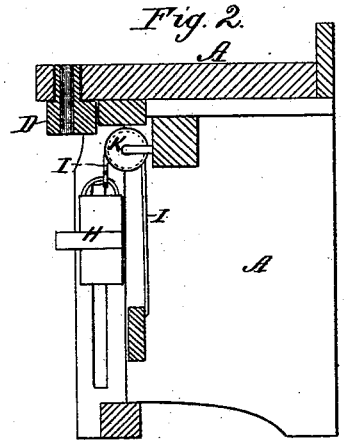 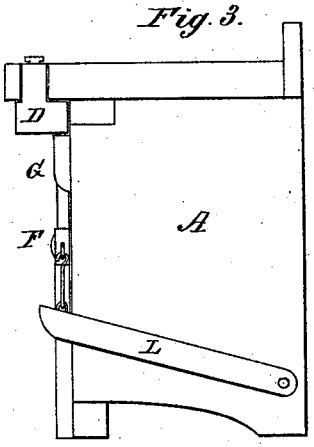
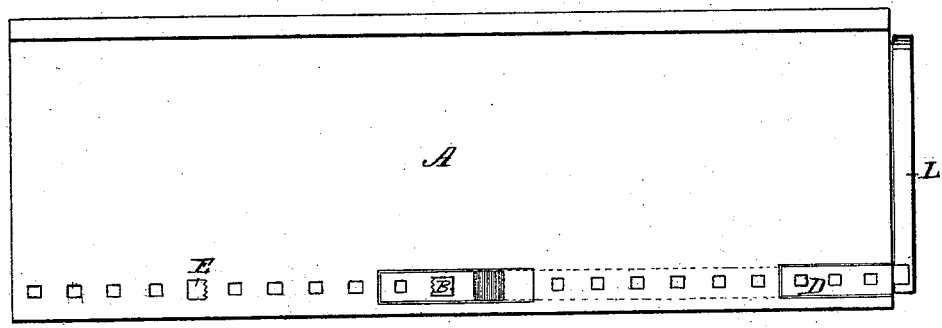
WITNESSES:
W. W. Hollingsworth
Amos M. Hart.
INVENTOR:
Geo. Lettenmyer
BY
ATTORNEYS.

UNITED STATES PATENT OFFICE.

GEORGE LETTENMYER, OF LITTLE GEORGETOWN, WEST VIRGINIA, ASSIGNOR TO HIMSELF AND ELI FLEMING, OF SAME PLACE.

CARPENTER'S WORK-BENCH.

SPECIFICATION forming part of Letters Patent No. 227,275, dated May 4, 1880.

Application filed July 9, 1879.

*To all whom it may concern:*

Be it known that I, GEORGE LETTENMYER, of Little Georgetown, in the county of Berkeley and State of West Virginia, have invented a new and Improved Carpenter's Work-Bench; and I do hereby declare that the following is a full, clear, and exact description of the same.

My invention is an improvement in the class of work-benches which are provided with a sliding dog or clamping-jaw operated by a lever.

I apply a weight to one end of a pivoted lever, which moves the slide that carries the movable dog, so that said weight will hold the dog pressed against the piece of wood to be clamped. To release the latter the weight is raised by a slide and a cord, which latter runs on a pulley elevated above the range of movement of the lever, so that by applying the foot to the slide the lever will carry the movable dog back out of engagement with the piece previously clamped by it, and on removing the foot the lever will move the dog toward said piece, as hereinafter described.

In accompanying drawings, forming part of this specification, Figure 1 is a side elevation of a bench provided with my improvements. Fig. 2 is a cross-section on line $x\ x$ of Fig. 1. Fig. 3 is an end view, and Fig. 4 a plan view.

The bench proper, A, has the usual construction. B indicates the movable dog, which is fixed in the block or head C of the bar D, which slides in ways formed by slots cut lengthwise in the top or table of the bench.

To operate the bar D, and thereby move the dog B toward or from the board or other piece $a$ to be clamped between it and the fixed dog E, I employ the weighted lever F, having arm G, the foot-rest or tripping-slide H, and a cord, I. The lever is pivoted near its middle to the front of the bench A, some distance below the sliding dog holder or carrier D. A weight is applied to the inner end of said lever to depress it; but I may substitute a spring in some cases. The rigid arm G projects upward from the lever, and is loosely jointed to the sliding bar D.

It is apparent that the weight holds the dog B against the piece $a$, and that by raising the weighted end of the lever F the arm I will move the bar D to the right, as shown in dotted lines in Fig. 1, and thus take the dog B out of contact with the piece $a$ and release it. This movement is effected by the foot-slide H and cord I. The foot-slide H works in vertical ways near the inner end of the lever F, and the cord I connects the two parts, passing intermediately over the pulley K. Thus, when the carpenter wishes to move back the dog B for the purpose of releasing the piece $a$, he has only to place his foot on the slide H and press it downward.

In case the carpenter desires to work at the end of the bench the dog B may be placed in one of the sockets formed in the outer or right-hand end of the bar D; and to enable him to tilt the lever F conveniently I connect with it the free end of the pivoted bar L.

I am aware that the sliding miter-jaws of a picture-frame clamp have been operated by an elbow-lever, foot-lever, and connecting-strap, and I therefore restrict myself to the following.

What I claim is—

In a carpenter's bench, the combination, with the weighted lever F and sliding bar D, carrying dog B, of the foot-slide H, working in vertical guides, and the cord I, connected with the weighted end of said lever and running over a pulley, K, which is located above the range of movement of the lever, all as shown and described, so that said dog is automatically thrown into engagement with the piece to be clamped, and removed therefrom by the operation of the foot-slide, as specified.

GEORGE LETTENMYER.

Witnesses:
J. NELSON WISNER,
THOMAS ZEPP.